United States Patent Office 3,535,410
Patented Oct. 20, 1970

3,535,410
METHOD FOR PRODUCING A HEAT SEALABLE VINYL POLYMER FILM
Frank E. Eastes, Simpsonville, S.C., assignor to W. R. Grace & Co., Duncan, S.C., a corporation of Connecticut
No Drawing. Original application Feb. 10, 1964, Ser. No. 343,468, now Patent No. 3,419,421, dated Dec. 31, 1968. Divided and this application June 24, 1968, Ser. No. 751,331
Int. Cl. B29c 17/02; B44d 5/00
U.S. Cl. 264—95         2 Claims

ABSTRACT OF THE DISCLOSURE

A method of making polyvinylidene chloride films heat sealable. A molten tube of polyvinylidene chloride is extruded and drawn downwardly from the extruder die by a pair of nip rollers in the conventional manner. A constant head of circulating cooling liquid is maintained within the tube between the nip of the rolls and the base of the die to supercool the tube as is conventional. The improvement lies in making the film heat sealable by including in the cooling liquid an aqueous soap solution consisting of water and an alkali metal salt of a fatty acid having 12 to 22 carbon atoms per molecule. The soap is present in an amount ranging from 0.1 to 1.0 weight percent based on the total cooling fluid.

---

This invention relates to a method for improving the heat seal strength of a film of vinylidene chloride polymer.

This application is a division of my application Ser. No. 343,468 filed Feb. 10, 1964, and which is now U.S. Pat. No. 3,419,421.

It is well known to produce containers from various thermoplastic materials such as polyolefine, polyvinyl chloride and polymers of vinyldene chloride. Generally, these containers such as plastic food bags are made in the form of extruded tubes of a thin thermoplastic material. The longitudinal edges of the sheet are lapped and are fused together under heat and pressure to form a tube. One open end is then heat sealed to form a bag. An appropriate length is cut from a roll of the flattened tubing and one end is sealed by fusion to form a bag. The food processor, after he inserts the foodstuff, may seal the bag by heat fusion, but more commonly he seals it by twisting the neck of the bag and securing it with a clip or tie.

Two methods of heating are commonly used. In the first, either one or both of the sealing jaws are heated, and the heated jaws are closed with the seam area of the plastic pinched between them. The jaws are held closed until the plastic between them has been heated by conduction and the two laminae have been fused together.

The second method induces the heat directly in the material. The jaws are not heated but are made parts of a high frequency electric circuit so that material between the jaws is heated to fusion temperature by the dielectric loss in the material when the high frequency circuit is energized.

Unfortunately, faulty seals are produced all too frequently. In general, failure does not usually occur in the film itself, but in isolated places along the seam. In a generally accepted test, known as the bag burst test, a fluid at increasing pressure is admitted into the bag until failure occurs. Generally, the two walls of the bags separate and a passage develops between them. In addition, oriented films such as biaxially oriented polymers of vinylidene chloride tend to blow out in an area immediately adjacent the seam area due to the disorientation of the film due to heating. Consequently, the great increase in strength achieved by orientation of the film is lost.

It has been found that a factor in the strength of a seal, particularly for polymers of vinylidene chloride, is the age of the film at the time the seal is made. The reason for this deterioration is not known. In general, this deterioration is not as much of a problem in polyethylene, polypropylene and other polyolefiin films as it is in the polymers of vinylidene chloride. Obviously, other factors effect the seal including such obvious factors as time, temperature, area, film thickness and the like. However, independent of these factors is the age of the film from the date of extrudation to the date of sealing. The temperature during this period is also important with the higher temperatures being more adverse than the lower temperatures.

It is an object of the invention to provide a method for improving the heat sealability of polymers of vinylidene chloride.

This and other objects of the invention will be readily apparent to those skilled in the art from the accompanying description and appended claims.

These objects are broadly accomplished by coating a polymer of vinylidene chloride on at least one heat sealable surface with an alkali metal salt of a fatty acid having 12 to 22 carbon atoms per molecule, inclusive. These additives are referred to herein as "soaps."

It is known to coat the surface of thermoplastic objects to be heat sealed with antitack agents, antistatic agents, slip agents and the like. One convenient method of doing this, particularly in the production of tubing or film, employs a so called "sock." The molten polymer is extruded through an annular die and the extrudate, which is in the form of a tube, is passed downwardly from the die through a pair of nip rolls. A head of a circulating cooling liquid, known as a "sock," is maintained within the tube between the nip of said rolls and the face of the die in order to supercool the tube. Dispersions or solutions of antitack agents, antistatic agents, slip agents, wetting agents and the like may be included in this cooling liquid. Further details of this process are described in British Pat. No. 849,070.

It has now been surprisingly found that if a soap is included in the sock as an aqueous solution, or in conjunction with other sock components, that a heat sealable surface is provided which has increased seal strength, as compared to a surface which has not been treated with the soap.

After the extruded tubing has solidified, it is known practice to orient the film by cold working such as stretching or by the formation of the bubble. The bubble is then deflated to form a tube from which a film suitable for heat sealing to form a container is prepared. Orientation, either monoaxially or biaxially, of the film is within the scope of the invention but the invention is not so limited.

The treating agent employed to increase the seal strength of the polymer is preferably a water soluble alkali metal salt of a fatty acid having 12 to 22 carbon atoms per molecule, preferably 14 to 20 carbon atoms per molecule, inclusive. In general, the treating agent is a sodium or potassium soap formed from either a saturated fatty acid or an unsaturated fatty acid or mixtures thereof. Suitable saturated fatty acids including lauric, myristic, palmitic, stearic, arachidic, behenic acids and the like. Suitable unsaturated fatty acids include Δ9-dodecylenic, palmitoleic, oleic, picinoleic, vaccenic, livoleic, electearic, parinaric, gadoleric, arachidonic, cetoleic acids and the like. In addition, the soaps may be formed from fats or oils containing the above, including coconut oil, babassu, palm kernel, palm, olive, castor, peanut, repe and the like.

It is preferred that the soap be soluble in water. However, any carrier fluid may be employed for depositing the soap onto the surface of the polymer so long as it is not detrimental to the polymer itself. It would appear that the length of the carbon chain of the fatty acid is not of significance. Sodium and potassium salts are preferred and the presence of various other cationic elements introduced with the soap into the composition are not detrimental.

The dispersion or solution, preferably in aqueous form, is applied to the polyolefin structure or surface in any convenient manner, such as dipping, spraying, brushing, roll coating, gravure coating, and the like, preferably at a temperature of about 60° to 120° F. The excess aqueous coating solution may be removed by squeeze rolls, doctor knives, or the like although in many instances no removal is necessary. The coating composition should be applied in such an amount that there will be deposited upon drying a smooth, evenly distributed layer about $1 \times 10^{-7}$ to about $1 \times 10^{-1}$ gram per square foot, about $1 \times 10^{-5}$ to $1 \times 10^{-3}$ gram per square foot being preferred. The thickness of the applied coating should be sufficient to form a thin, relatively transparent film spread evenly over the surface of the coated surface, preferably the soap is dissolved in water at a concentration of 0.01 to 10.0 weight percent, more preferably 0.1 to 1.0 weight percent based on total composition weight.

The treating agent may be applied to one or both sides of the surface but should in any case be applied to the the surface to be subsequently heat sealed. The invention is described primarily with reference to the heat sealing of a film although improvement is found with any shape of the polymer such as tubing or solid structures.

Any suitable method may be employed for heat sealing the two surfaces together such as impulse sealing or inductive heating by high frequency electrical energy.

The treating agent is broadly applicable to the surface treatment of a synthetic organic thermoplastic polymer and is particularly useful for vinyl polymers including polyvinyl chloride, the polyvinylidene chloride polymers and the copolymers of vinylidene chloride and other ethylenically unsaturated monomers including the vinyl esters such as vinyl acetate, vinyl butyrate, vinyl benzoate and the like; the vinyl ethers such as vinyl ethyl ether, vinyl chloroethyl ether, vinyl phenyl ether and the like; the vinyl ketones such as vinyl methyl ketone, vinyl phenyl ketone and the like; the vinylidene halides such as vinylidene chloride, 1-fluoro 1-chloroethylene and the like; the acrylic compounds such as acrylonitrile, chloroacrylonitrile, methyl acrylate, methyl methacrylate, 2-ethylhexyl acrylate and the like; the allylic compounds such as alkylidene diacetate, chloroallylidene diacetate and the like; and other mono-unsaturated compounds.

The term polymer as used herein includes homopolymers, copolymers, terpolymers, block copolymers and the like. Particularly preferred are the vinylidene chloride copolymers which are predominately vinylidene chloride, preferably 20 to 80 percent vinylidene chloride, with the comonomer preferably being vinyl chloride.

The invention is best illustrated by the following examples.

EXAMPLE I

The effect of surface contamination on seal strength was determined at 1.5 mil Saran polymer tubing having the following composition:

| | Percent |
|---|---|
| Saran polymer [1] | 90.3 |
| Dibutyl sebacate | 6.0 |
| Diisobutyl adipate | 3.0 |
| MgO | 0.6 |
| Hydrofol glyceride (hydrogenated vegetable oil) | 0.1 |
| | 100.0 |

[1] Dow 925 Saran Resin, a copolymer of vinylidene chloride and vinyl chloride, Dow Chemical Co., Midland, Mich.

An aqueous dispersion of a number of materials was placed on a heat sealable surface of the Saran polymer tubing. The surface concentration was determined by weighing the sample, placing the contaminate on the surface in the form of a dilute solution or dispersion and reweighing after drying. The treated sample was then heat sealed to itself by a radio frequency sealer having ¼ inch Teflon coated sealing jaws using a 0.2 second pulse, 40 p.s.i. jaw pressure and an initial jaw temperature of 140° F. Cooling time was 1 second after sealing. The rheostat was set at 70. The power was supplied by a radio frequency generator, a model 2 DA produced by Lake Service Corp., Boston, Mass.

An untreated sample was heat sealed in the same manner. The bag burst strength of the samples were determined by subjecting the thus prepared sealed bags (sealed at one end) to an internal air pressure (measured in inches of water) which was gradually increased until the seam failed.

The ratio of the heat seal strength of the contaminated samples to untreated samples was then compored. A ratio greater than 1.0 represents an improvement; less than 1.0 indicates that the contaminate was detrimental to heat sealing.

TABLE I

| Contamination | Concentration, gm./f² | Strength ratio |
|---|---|---|
| Run No.: | | |
| 1 —— 0.5% polyoxyethylene esters of tall oil[1] | $7 \times 10^{-3}$ | 0.85 |
| 2 —— 0.5% polyoxyethylene esters of tall oil | $1.7 \times 10^{-1}$ | 0.65 |
| 3 —— 1.5% glycerol mannitan laurate[2] | $4.4 \times 10^{-2}$ | 0.86 |
| 4 —— Polyvinyl chloride dispersion[3] | $2.8 \times 10^{-3}$ | 0.57 |
| 5 —— Sodium lauryl sulfate | $5.0 \times 10^{-4}$ | 0.98 |
| 6 —— do | $7.4 \times 10^{-3}$ | 0.60 |
| 7 —— Ivory soap[4] | $2.5 \times 10^{-5}$ | 1.14 |
| 8 —— Ivory soap | $1.1 \times 10^{-3}$ | 1.10 |

[1] Renex 20, Atlas Powder Co.
[2] NNO, Atlas Powder Co.
[3] Geon 121, B. F. Goodrich Co.
[4] Proctor and Gamble Co.

The above data show that conventional stock components (Runs 1–4) are actually detrimental to the heat seal strength of the polymer film. Surprisingly, Ivory Soap (Runs 7–8) actually improves the heat seal strength whereas another common detergent, sodium lauryl sulfate, (Runs 5–6) is quite detrimental.

EXAMPLE II

Saran polymer having the formulation shown in Example I was extruded vertically downward at a 325° F. forward cylinder temperature through a 2½ inch annular die having a 90 mil gap. The extruded tube was pinched off by a set of squeeze rolls below the die. These rolls also served to pull the tubing away from the die and stretch it down to the desired gauge.

The tubing between the die and the pinch rolls was substantially filled with a liquid known as a "sock." The composition of this "sock" was varied for each of the following runs to determine the effect of different soaps on the ultimate heat seal strength of the polymer. For control purposes the "control sock" composition comprised:

| | Weight percent |
|---|---|
| Finely divided polyvinyl chloride resin (Geon 121, B. F. Goodrich Co.) | 25 |
| Glycerol mannitan laurate, non-ionic detergent (NNO, Atlas Powder Co.) | 1.03 |
| Polyoxyethylated tall oil (16 moles ethylene oxide—a non-ionic detergent, Atlas Powder Co.) | 0.62 |
| An emulsion of polydialkylsiloxane, an antifoam emulsion (Antifoam 60, General Electric Co.) | 0.2 |
| Water | 73.15 |

This liquid was continuously circulated to a reservoir maintained at about 60° F.

The tubing emerging from the first set of pinch rolls was continuously inflated by means of a bubble of air, deflated by a second set of rolls ad wound up as a flattened tubing. This tubing had a wall thickness of 1.5 mils and was biaxially oriented.

Several series of runs were made comparing the control sock with different sock compositions. For each series (Runs 8, 9, 10, 11 in Table II) a different control was run. For each series seals were made at a rheostat setting of 70 (except Runs 11A-B-C-D which was 80) within 24 hours after extrusion. Prior to sealing these "fresh" films were held in a cold room at 40° F. so that no deterioration would take place. For these "fresh" films the bag burst test was made 24 hours or more after sealing. The aged samples were aged for the specified time at 45° C. Again the bag burst test was made 24 hours or more after the seals were made. There is every indication that after 24 hours aging there is no reduction in seal strength measured from the time the seal is made but that the time from extrusion until seal is an important factor in seal strength although this is negligible at the lower temperatures of the "cold room." The results are shown in the following table.

TABLE II

| Run No.: | Sock composition*, wt. percent | Fresh | Seal strength, 4 days aging | Inches $H_2O$ 8 days aging |
|---|---|---|---|---|
| 8A | Control | 106 | 57 | |
| 8B | 10% PVC[1] plus 0.5% Ivory soap [2] | 100 | 66 | |
| 8C** | do.[2] | 104 | 75 | |
| 8D | 25% PVC plus 0.5% Ivory soap | 104 | 83 | |
| 8E** | 1.0% Ivory soap | 96 | 89 | |
| 9A | Control | 103 | 54 | |
| 9B** | 0.825% Na stearate, 16.5% PVC, 1% antifoam [3] | 107 | 80 | |
| 9C | 1.10% Na myristate, 16.5% Zn stearate, 1% antifoam | 92 | 58 | |
| 10A | Control | 110 | 61 | 52 |
| 10B | Control plus 1% K oleate (unrefined) | 117 | 77 | 65 |
| 10C | Control plus 4% K oleate (unrefined) | 120 | 82 | 68 |
| 10D | Control plus 1% coconut oil soap [4] | 123 | 78 | 63 |
| 10E | Control plus 4% coconut oil soap | 92 | 73 | 67 |
| 11A | Control | 121 | 51 | |
| 11B | Control plus 4% K oleate (unrefined) | 123 | 69 | |
| 11C | 4% K oleate plus 25% PVC plus 30% propylene glycol | 115 | 67 | |
| 11D | 4% coconut oil soap [4] plus 8% PVC plus 72% propylene glycol | 102 | 69 | |

\* Unless otherwise specified the remainder of the sock composition was water.
\*\* Employed a double sock technique wherein some sock was permitted to pass the first set of rolls.
[1] Polyvinyl chloride resin plus Geon 121, B. F. Goodrich Co.
[2] Procter and Gamble Corp.
[3] Polydialkylsiloxane, Antifoam 60, General Electric Co.
[4] Kokobace R, Nopco Chemical Co.

The above data show the effectiveness of the addition of soap, with and without other additives, to a sock for coating the inside surface of the tubing for subsequent heat sealing. In all examples this inside surface of the tubing was the sealing surface so that inside to inside surfaces were heat sealed together.

EXAMPLE III

The effect of different seal temperatures and prolonged aging was determined on the samples prepared in Example II. The seals were made as described in Example II with the samples aged at room temperature (about 75° F.) for the time shown in the following table.

TABLE III

| Run No. | Sock composition, wt. percent | RF power setting | Seal strength vs. weeks aging | | | | | |
|---|---|---|---|---|---|---|---|---|
| | | | Fresh | 1 | 2 | 4 | 6 | 9 |
| 12A | Control (Same as Run 8A) | 70 | 109 | 97 | 88 | 76 | 76 | 65 |
| | | 90 | 116 | 98 | 95 | 84 | 82 | 77 |
| | | 110 | 112 | 98 | 96 | 85 | 83 | 80 |
| 12B | 1.0% Ivory soap (Same as Run 8E) | 70 | 115 | 117 | 121 | 116 | 84 | 72 |
| | | 90 | 123 | 118 | 123 | 115 | 84 | 85 |
| | | 110 | 127 | 124 | 120 | 111 | 91 | 93 |
| 13A | Control (Same as Run 9A) | 70 | 114 | 102 | 95 | 84 | 79 | 68 |
| | | 90 | 119 | 98 | 93 | 90 | 84 | 81 |
| | | 110 | 120 | 99 | 97 | 94 | 87 | 86 |
| 13B | 0.825% Na stearate, 16.5% PVC, 1% antifoam (Same as Run 9B) | 70 | 125 | 113 | 112 | 101 | 100 | 85 |
| | | 90 | 127 | 115 | 113 | 106 | 105 | 94 |
| | | 110 | 126 | 116 | 113 | 109 | 107 | 103 |
| 14A | Control | 70 | 104 | 89 | 85 | 77 | 73 | 53 |
| | | 90 | 112 | 91 | 88 | 84 | 81 | 75 |
| | | 110 | 110 | 91 | 90 | 86 | 84 | 80 |
| 14B | 0.1% Castile soap plus control sock | 70 | 120 | 116 | 106 | 94 | 94 | 79 |
| | | 90 | 130 | 119 | 111 | 105 | 102 | 88 |
| | | 110 | 133 | 116 | 112 | 105 | 105 | 99 |
| 15A | Control (Same as Run 10A) | 70 | 111 | 107 | 104 | 95 | 90 | 65 |
| | | 90 | 121 | 111 | 108 | 101 | 97 | 86 |
| | | 110 | 118 | 111 | 008 | 104 | 100 | 97 |
| 15B | Control plus 4% K oleate (Same as Run 10C) | 70 | 115 | 121 | 117 | 110 | 103 | 96 |
| | | 90 | 129 | 116 | 122 | 115 | 110 | 106 |
| | | 110 | 132 | 121 | 120 | 116 | 115 | 115 |
| 16A | Control | 70 | 109 | 100 | 93 | 85 | 84 | 68 |
| | | 90 | 116 | 98 | 99 | 89 | 89 | 81 |
| | | 110 | 117 | 102 | 102 | 94 | 91 | 89 |
| 16B | 25% PVC, 2% K oleate, 15% propylene glycol | 70 | 107 | 98 | 98 | 88 | 88 | 49 |
| | | 90 | 111 | 102 | 100 | 98 | 96 | 86 |
| | | 110 | 118 | 101 | 104 | 100 | 102 | 92 |

These data demonstrate that soaps are effective in prolonging the ability of the film to form strong seals over a wide range of sealing temperatures even when stored for as long as 9 weeks at 75° F.

While certain examples, structures, compositions and process stops have been described for purposes of illustration, the invention is not limited to these. Variation and modification within the scope of the claims may be effected by those skilled in the art.

I claim:
1. In the method for producing a heat sealable film wherein a tube of molten copolymer of vinylidene chloride is continuously extruded and drawn downwardly from the extruder die by a pair of nip rollers, a constant head of circulating cooling liquid known as a sock being maintained within the tube between the nip of said rolls and the base of said die in order to supercool the tube, the improvement of making the film heat sealable comprising including in said cooling liquid an aqueous soap solution consisting of water and an alkali metal salt of a fatty acid having 12 to 22 carbon atoms per molecule, said soap being present in an amount ranging from 0.1 to 1.0 weight percent based on the total cooling fluid.

2. The improved method of claim 1 wherein said cooling liquid consists of a composition prepared by admixing a finely divided polyvinyl chloride resin, a non-ionic detergent, an antifoaming agent, water, and said soap.

References Cited

UNITED STATES PATENTS

| | | | |
|---|---|---|---|
| 2,541,064 | 2/1951 | Irons | 264—95 |
| 3,252,826 | 5/1966 | Salzinger. | |

ROBERT F. WHITE, Primary Examiner

J. H. SILBAUGH, Assistant Examiner

U.S. Cl. X.R.

264—129